United States Patent [19]

Yokonuma et al.

[11] Patent Number: 4,660,956
[45] Date of Patent: Apr. 28, 1987

[54] ELECTRONIC FLASH DEVICE

[75] Inventors: Norikazu Yokonuma, Tokyo; Nobuyoshi Hagiuda, Kawasaki, both of Japan

[73] Assignee: Nippon Kogaku K. K., Tokyo, Japan

[21] Appl. No.: 835,296

[22] Filed: Mar. 3, 1986

[30] Foreign Application Priority Data

Mar. 11, 1985 [JP] Japan .................. 50-47803

[51] Int. Cl.$^4$ .................. G03B 15/05; H05B 41/36
[52] U.S. Cl. .................. 354/416; 354/427; 315/241 P
[58] Field of Search .................. 354/413, 416, 417, 418, 354/425, 427, 428, 459, 460, 461, 464, 145; 315/241 P, 151

[56] References Cited

U.S. PATENT DOCUMENTS

| 4,072,961 | 2/1978  | Yamada       | 354/427   |
| 4,112,446 | 9/1978  | Numata et al. | 354/464   |
| 4,149,786 | 4/1979  | Sahara et al. | 354/460 X |
| 4,181,413 | 1/1980  | Kawasaki     | 354/425   |
| 4,236,801 | 12/1980 | Takami       | 354/459   |
| 4,404,496 | 9/1983  | Hosoda       | 315/241 P |
| 4,416,524 | 11/1983 | Takayama     | 315/241 P |
| 4,460,262 | 7/1984  | Mizokami     | 354/416 X |
| 4,470,684 | 9/1984  | Harvey       | 354/413   |

FOREIGN PATENT DOCUMENTS

| 14472  | 2/1977  | Japan | 354/428 |
| 157726 | 12/1980 | Japan | 354/425 |

Primary Examiner—W. B. Perkey
Attorney, Agent, or Firm—Shapiro and Shapiro

[57] ABSTRACT

An amplification factor selection circuit for an automatic light emission control circuit which enables selection of an amplification factor in accordance with an F-value, comprises a flash bulb for emitting a flash light to an object, a photo-sensor for sensing a light reflected from the object, an amplifier for amplifying the photocurrent of the photosensor, a capacitor for starting charging upon emission of the flash light, a semiconductor device for controlling a charging current of the capacitor in accordance with an output of the amplifier, a light emission suppress circuit for suppressing the light emission when the capacitor is charged up to a predetermined level. A first reference voltage applied to the input terminal of the amplifier and a second reference voltage applied to the output of the transistor are relatively controlled. Two constant current sources are connected to opposite ends of a resistor and a point on the resistor is clamped to a predetermined potential. One of the voltages developed at the opposite ends of the resistor is used as the first reference voltage and the other is used as the second reference voltage to control the point on the resistor clamped to the predetermined potential.

11 Claims, 3 Drawing Figures

ELECTRONIC FLASH DEVICE

BACKGROUND OF THE INVENTION

1. Field of the Invention

The present invention relates to light emission control in an electronic flash device of a camera.

2. Related Background Art

A conventional electronic flash device of a camera uses a light emission control circuit for stopping light emission from the flash device when a light emitted by the flash device and reflected by an object reaches a predetermined light intensity.

The light emission control circuit converts the light emitted from the electronic flash device and reflected by the object to a photo-current by a photosensor, amplifies the converted photo-current by an amplifier and charges up an integration capacitor. When the charge in the integration capacitor reaches a predetermined level (reference voltage), the light emission from the flash device is stopped.

The light emission control of the electronic flash device by such a light emission control circuit can be switched in accordance with a F-value of the camera.

FIG. 1 shows a portion of a light emission control circuit. A reflection light from an object is converted to a photo-current by a photo-sensor 24, and the photo-current is logarithmically amplified by an operational amplifier 22 having a logarithmical compression diode 25 connected in a negative feedback fashion, and an output of the operational amplifier is logarithmically expanded by a transistor 31. An integration capacitor 29 is connected to a collector of the transistor 31 and it is charged up by the photo-current amplified by the transistor 31. A transistor 28 is connected in parallel to the integration capacitor 29 and the charging of the integration capacitor 29 is initiated upon turn-off of the transistor 28 at the start of flashing.

The charged voltage in the capacitor 29 is supplied to a minus input of a comparator 23, and when it reaches a reference voltage of a reference power supply 30 connected to a plus terminal of the comparator, the comparator 23 produces an output to stop the light emission of the flash device.

In such a light emission control circuit, an amplification factor of the amplifier unit comprising the operational amplifier 22 and the transistor 31 is uniquely determined by a difference (Vf−Ve) between a voltage Vf applied to the operational amplifier 22 from a power supply 36 and a voltage Ve applied to an emitter of the transistor 31 through an buffer amplifier 38. The voltage Ve is developed by supplying a current from a constant current cource 27 through resistors 33 and 34 and it is applied through the buffer amplifier 38. Accordingly, a usual way to change the amplification factor is to provide switching means 35a in parallel with the resistor 33 and switch the voltage Ve by turning on and off the switching means 35a. However, the resistor 33 cannot be perfectly shortened even if the switch 35a is turned on because of a contact resistance. Since the resistance of the resistor 33 is small, a precise control of the amplification factor is not attained.

The switching means 35a is usually implemented by a transistor. The voltage difference per stage of F-value is several tens mV while a collector-emitter voltage Vce of the ON transistor is usually approximately 100 mV. As a result, the change of the voltage due to turn-on and turn-off of the transistor is too much to allow the change of the amplification factor in accordance with the selected F-value. In addition, because a mechanical switch is used, a structure of the mechanical switch is complex in order to allow multiple switching of the amplification factor.

SUMMARY OF THE INVENTION

It is an object of the present invention to provide an amplification factor selection circuit for an automatic light emission control circuit which enables selection of an amplification factor in accordance with an F-value.

In order to achieve the above object, in accordance with the light emission control circuit of the present invention, there are provided a flash bulb for emitting a flash light to an object, a photo-sensor for sensing a light reflected from the object, an amplifier for amplifying the photo-current of the photo-sensor, a capacitor for starting charging upon emission of the flash light, a semiconductor device for controlling a charging current of the capacitor in accordance with an output of the amplifier, a light emission suppress circuit for suppressing the light emission when the capacitor is charged up to a predetermined level. A first reference voltage applied to the input terminal of the amplifier and a second reference voltage applied to the output of the transistor are relatively controlled. Two constant current sources are connected to opposite ends of a resistor and a point on the resistor is clamped to a predetermined potential. One of the voltages developed at the opposite ends of the resistor is used as the first reference voltage and the other is used as the second reference voltage to control the point on the resistor clamped to the predetermined potential.

DESCRIPTION OF THE PREFERRED EMBODIMENTS

Figure 2:
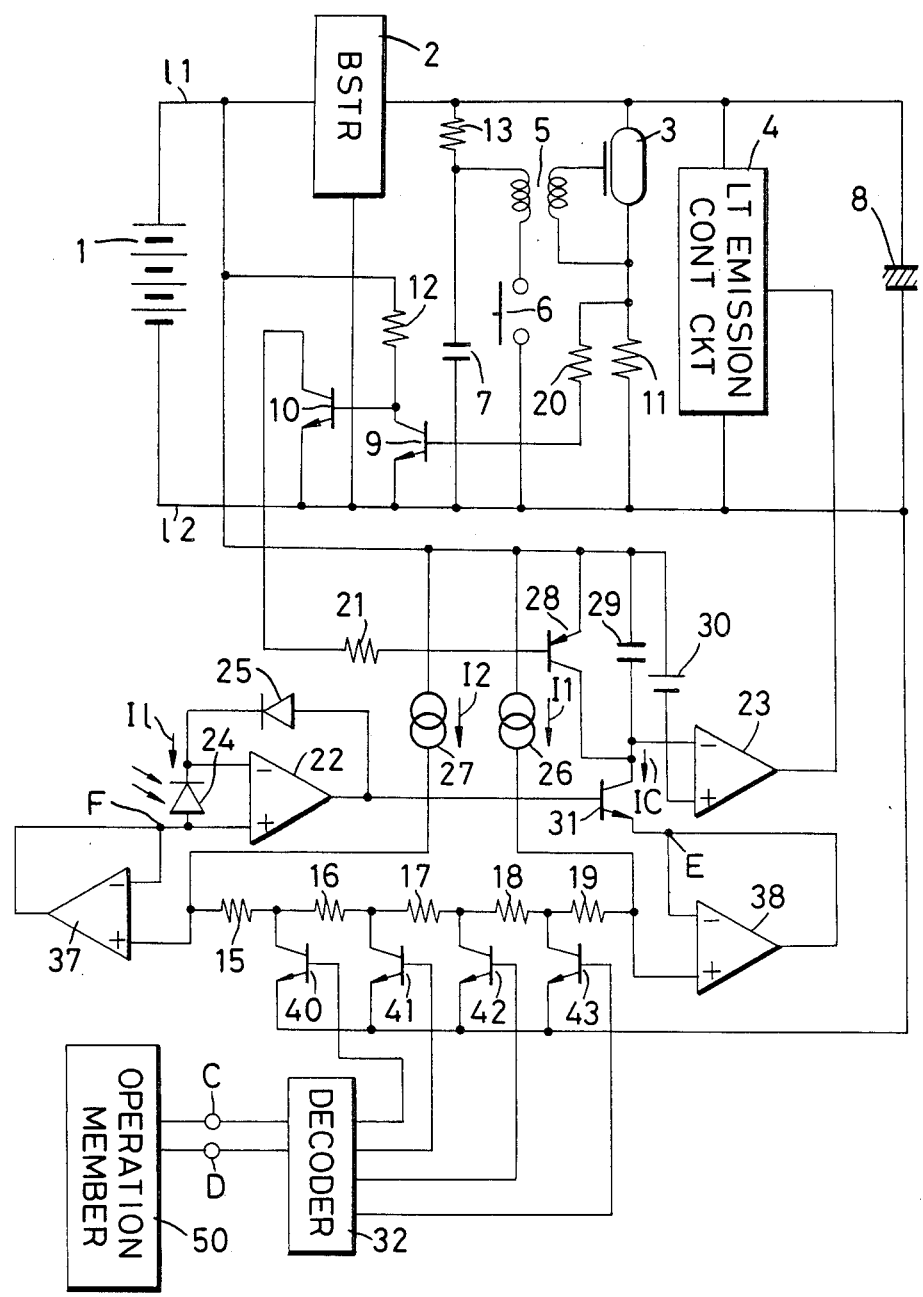
FIG. 2 is a circuit diagram of an embodiment of the present invention.

FIG. 2 shows one embodiment of the present invention. Numeral 1 denotes a power supply. A positive (+) terminal of the power supply 1 is connected to a power line 11 and a negative (−) terminal is connected to a ground line 12. The power line 11 is connected to a booster circuit 2 which boosts or steps up the power supply voltage. An output of the booster circuit 2 charges up a main capacitor 8 and also charges up a trigger capacitor 7 through a resistor 13. As an X contact switch 6 is closed upon the completion of charging of the main capacitor 8, a current flows through a primary winding of a trigger transformer 5 so that a high voltage is developed in a secondary winding and it triggers a xenon tube 3. As the xenon tube is triggered, the charge in the main capacitor 8 is discharged into the xenon tube 3 so that the xenon tube 3 starts to emit a light. A voltage is developed across a resistor 11 by the discharging current to the xenon tube 3 so that a transistor 9 is turned on through a resistor 20. As the transistor 9 is turned on, the operation of the overall circuit is started. When the amount of light emitted by the xenon tube 3 reaches a proper level, a stop signal is applied to the light emission control circuit 4 so that it discharges the charge stored in the main capacitor 8. As a result, the light emission of the xenon tube 3 is stopped.

On the other hand, the present circuit has a photo-sensor 24 for sensing the light emitted from the flash device and reflected by the object. A photo-current photo-electrically converted by the photo-sensor 24 is applied to an operational amplifier 22 which is a logarithmic amplifier having a logarithmic compression diode 25 connected in a feedback manner. The photo-current from the photo-sensor 24 is logarithmically compressed and then supplied to a transistor 31. The transistor 31 logarithmically expands the photo-current which has been logarithmically compressed by the operational amplifier 22. An integration capacitor 29 is connected in series to a collector of the transistor 31. The integration capacitor 29 is connected in parallel with a discharge resetting transistor 28. A collector of a transistor 10 is connected to the transistor 28 through a resistor 21. As the transistors 10 and 28 are turned off by the turn-on of the transistor 9 when the xenon tube 3 emits the light, the charging of the integration capacitor 29 starts.

A junction of the integration capacitor 29 and the transistor 31 is connected to a negative (−) input terminal of a comparator 23, and a reference voltage from a reference voltage supply 30 for setting a proper light amount is applied to a positive (+) input terminal of the comparator 23. The output of the comparator 23 is reversed when the charged voltage of the integration capacitor 29 reaches the reference voltage, that is, when the proper light amount is reached, to supply a stop signal to the light emission control circuit 4.

Circuit means for selecting an amplification factor of the amplifier stage comprising the operational amplifier 22 and the transistor 31 is now explained.

The amplification factor of the amplifier stage comprising the operational amplifier 22 and the transistor 31 is uniquely determined by a difference (Vf−Ve) between a reference voltage Vf applied to a positive (+) input terminal of the operational amplifier 22 and a reference voltage Ve applied to an emitter of the transistor 31. The photo-current Il of the photosensor 24 and the charging current Ic of the integration capacitor 29 have the following relationship.

$$Ic = Il \cdot e^{\frac{q}{kT}(Vf-Ve)} \quad (1)$$

As seen from the equation (1), the light emission can be controlled by the F-value by changing the voltage difference Vf−Ve in accordance with the F-value. When the F-value is switched one step toward the open end, the amplification factor must be doubled. The charging current, voltage at a point E and a voltage at a point F under this condition are represented by Ic1, Ve1 and Vf1. From the equation (1), $$Ic1 = Il \cdot e^{\frac{q}{kT}(Vf1-Ve1)} = 2Ic$$

Thus, $$Il \cdot e^{\frac{q}{kT}(Vf1-Ve1)} = 2Il \cdot e^{\frac{q}{kT}(Vf-Ve)}$$

Accordingly, $$2 = e^{\frac{q}{kT}\{(Vf1-Ve1)-(Vf-Ve)\}}$$

By taking natural logarithmic function, we get $$ln2 = \{(Vf1-Ve1)-(Vf-Ve)\} \cdot q/kT$$

The change of voltage difference between the points F and E is represented by $$(kT/q)ln2 = (Vf1-Ve1)-(Vf-Ve)$$

where T is an absolute temperature, q is an element charge ($q=1.60\times10^{-19}$) and k is a voltzmann constant ($k=1.38\times10^{-23}$). Thus, if an environment temperature is 25° C., $$(Vf1-Ve1)-(Vf-Ve) = 0.0178 \text{ volt}$$

Thus, when the F-value is switched one step toward the open end, the voltage difference (Vf−Ve) between the points F and E is to be increased by 17.8 mV.

In the present embodiment, in order to switch the voltage difference (Vf−Ve) to obtain the proper amplification factor to the F-value, a pair of constant current sources 26 and 27 which supply constant currents I1 and I2, respectively, are provided, and a plurality of ladder resistors, that is, five ladder resistors 15, 16, 17, 18 and 19 in the present embodiment, are connected in series between the constant current sources 26 and 27. The resistances of the ladder resistors 15-19 are represented by R15, R16, R17, R18 and R19.

The junction points of the ladder resistors 15-19 are grounded through switching transistors 40, 41, 42 and 43. Outputs of a decoder 32 are connected to the switching transistors 40-43, and an F-value signal is supplied to input terminals C and D of the decoder 32 by a manipulation member 50 which is manipulated in accordance with the F-value of the imaging lens to generate the F-value signal consisting of two binary bits which changes with the manipulation. The decoder 32 produces a high level signal at one of four output terminals to turn on one of the transistors 40 to 43 in accordance with the F-value. As one transistor is turned on, the constant currents I1 and I2 flow from the constant current sources 26 and 27 to the ground point. The reference voltage developed at the left end of the ladder resistor network is applied to the point F as the reference voltage Vf through the buffer amplifier 37, and the reference voltage developed at the right end of the ladder resistor network is applied to the point E as the reference voltage Ve through the buffer amplifier 38.

Assuming that the transistor 42 is turned on by the decoder 32, the constant current I1 from the constant current source 26 flows through the ladder resistors 19 and 18 and the trnasistor 42, and the constant current I2 from the constant current source 27 flows through the ladder resistors 15, 16 and 17 and the transistor 42. Since the voltage Ve at the point E is same as the input voltage to the buffer amplifier 38, it is determined by the current I1 from the constant current source 26, the resistors 18 and 19 and the collector-emitter voltage Vce of the transistor 42. Since the voltage at the point F is same as the input voltage to the buffer amplifier 37, it is determined by the current I2 of the constant current source 27, the resistors 15, 16 and 17 and the collector-emitter voltage Vce of the transistor 42. Thus, the voltage difference Vf−Ve between the points F and E which determines the F-value is represented by $$Vf - Ve = \{I2 \cdot (R15 + R16 + R17) + Vcc\} - \{I1 \cdot (R18 + R19) + Vcc\}$$
$$= I2 \cdot (R15 + R16 + R17) - I1 \cdot (R18 + R19)$$

Thus, it is not affected by the collector-emitter voltage Vce of the transistor 42.

The amplification factor is given by $$Ic/Ie = e^{\frac{q}{kT}\{I2\cdot(R15+R16+R17)-I1(R18+R19)\}}$$

However, the amplification factor given by the above formula changes with temperature. If temperature proportional constant current sources in which the constant current outputs vary in proportion to the temperature are used as the constant current sources 26 and 27, the constant currents I1 and I2 are represented by I1=A1 .T and I2=A2 .T, and the amplification factor is given by $$Ic/Il = e^{\frac{q}{kT}\{A2\cdot T(R15+R16+R17)-A1\cdot T(R18+R19)\}}$$
$$= e^{\frac{q}{k}\{A2\cdot T(R15+R16+R17)-A1\cdot T(R18+R19)\}}$$

Thus, the variation by the change of temperature can be avoided.

When the F-value is switched to a smaller value, the transistor 42 is turned off by the output of the decoder 32 and the transistor 41 is turned on. The voltage difference Vf2−Ve2 between the points F and E when the transistor 41 is turned on is represented by $$Vf2 - Ve2 = I2(R15+R16) - I1(R17+R18+R19)$$

Thus, the change of the voltage difference from the voltage difference Vf−Ve which was developed when the transistor 42 was turned on is given by $$(Vf-Ve)-(Vf2-Ve2) = I2\cdot R17 + I1\cdot R17$$

If the currents I1 and I2 of the constant current sources 26 and 27 are equal to I1, $$(Vf-Ve)-(Vf2-Ve2) = 2I1\cdot R17$$

If the F-value is switched by one step, the change of the voltage difference is given by $$2I1\cdot R17 = 17.8 \text{ mV}$$

If the F-value is switched by one-half step, the change is given by $$2I1\cdot R17 = 8.9 \text{ mV}$$

If the F-value is switched by two steps, the change is given by $$2I1\cdot R17 = 35.6 \text{ mV}$$

The currents I1 and I2 of the constant current sources 26 and 27 and the resistance R17 are adjusted such that the voltage differences corresponding to the number of steps of switching of the F-value are developed. Thus, as the transistor is switched from 42 to 41, the change of the voltage difference which derives an amplification factor corresponding to the number of steps of the switching of the F-value can be produced. When the transistor 40 or 43 is turned on, the F-value may be determined in the same manner.

Figure 1:
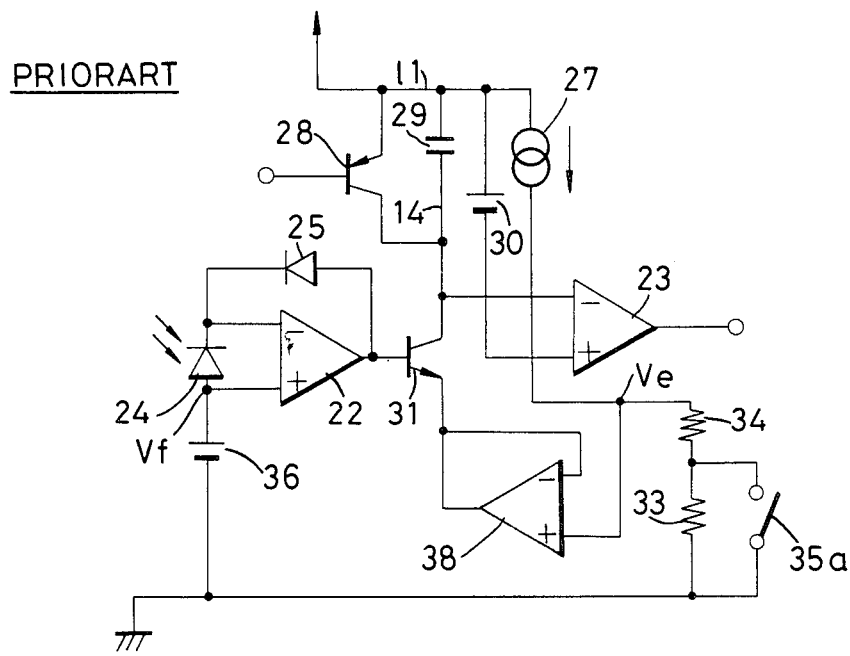
FIG. 1 is a circuit diagram of a portion of a conventional electronic flash device.
Figure 3:
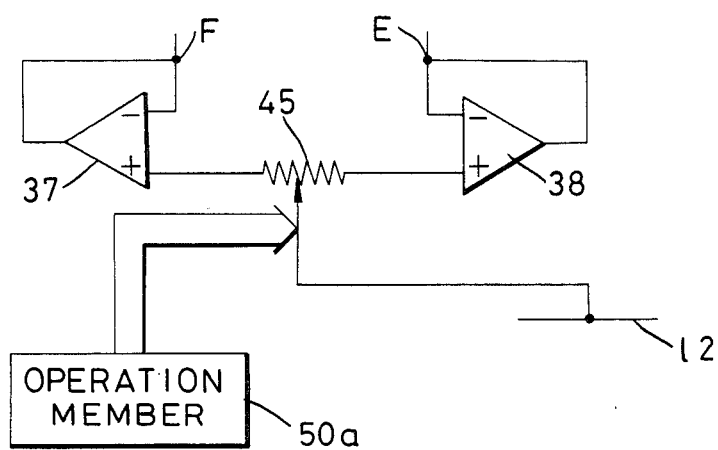
FIG. 3 shows a modification of the embodiment of FIG. 2.

In the present embodiment, the F-value is switched by turning on and off the transistors. A similar effect is obtained when FET's are used in place of the transistors. The series-connected ladder resistor network may be substituted by a continuously variable potentiometer. When mechanical switches are used in place of the transistors as shown in FIG. 3, contact resistances of the switches can be neglected. In the present embodiment, the circuit used to control the light emission of the flash device is described, although the present invention is not limited thereto but it may be applied to a light measurement circuit of a camera. The manipulation member 50 may be manipulated in accordance with the F-value as well as a film sensitivity.

Because the voltage difference required to switch the amplification factor for one step of the F-value is small, that is, 17.8 mV, the precise F-value switching is attained over a multiple steps without requiring a special power supply circuit. Since the reference voltage of the amplifier and the collector current of the output transistor are controlled by the common resistor, the circuit configuration is simplified.

A potentiometer 45 in FIG. 3 takes place of the resistors 15–19, the transistors 40–43 and the decoder 32 shown in FIG. 2. By manipulating the manipulation member 50a, the point connected to the line 12 is changed.

We claim:

1. An electronic flash device for a camera comprising:
    (a) photo-electric conversion means for generating an output representative of a light from an object;
    (b) flash light means for emitting a flash light to the object;
    (c) capacitor means;
    (d) first control means for controlling charging of said capacitor means in accordance with the output of said photo-electric conversion means;
    (e) second control means for controlling said flash light means in accordance with a charge stored in said capacitor means;
    (f) a resistor;
    g) clamp means for clamping a point on said resistor to a predetermined potential;
    (h) first constant current means connected to one end of said resistor for supplying a first current;
    (i) second constant current means connected to the other end of said resistor for supplying a second current;
    (j) said one point clamped by said clamp means being located between said one end and said other end of said resistor; and
    (k) said first control means controlling charging of said capacitor means in accordance with potentials at said one end and said other end of said resistor.

2. An electronic flash device for a camera according to claim 1 further comprising changing means for changing said one point of said resistor clamped by said clamp means.

3. An electronic flash device for a camera according to claim 2 wherein said first constant current means supplies said first current between said one end and said one point clamped by said clamp means on said resistor, and said second constant current means supplies said second current between said other end and said one point clamped by said clamp means on said resistor.

4. An electronic flash device for a camera according to claim 2 wherein said clamp means includes a plurality of switching means connected between a plurality of points on said resistor and a line of said predetermined potential.

5. An electronic flash device for a camera according to claim 4 wherein said changing means includes conduction means for selectively conducting said switching means.

6. An electronic flash device for a camera according to claim 5 wherein said switching means include semiconductor devices.

7. An electronic flash device for a camera according to claim 5 further comprising a manipulation member adopted to be manipulated in accordance with an F-value of said camera, wherein said conduction means conducts one of said switching means in response to said manipulation means.

8. An electronic flash device for a camera according to claim 5 wherein said first control means includes amplifier means for amplifying the output of said photo-electric conversion means and a semiconductor device for controlling a charging current to said capacitor means in accordance with the amplified output of said amplifier means.

9. An electronic flash device for a camera according to claim 8 wherein said amplifier means amplifies the output of said photo-electric conversion means in accordance with the potential at said one end of said resistor, and said semiconductor device controls the charging current to said capacitor means in accordance with the potential at said other end of said resistor.

10. An electronic flash device for a camera according to claim 8 wherein said capacitor means starts charging in response to the start of light emission by said flash light means.

11. An electronic flash device for a camera according to claim 10 further comprising means for generating a detection signal when the charge in said capacitor means reaches a predetermined level, and means for stopping the light emission by said flash light means in response to said detection signal.

* * * * *